United States Patent [19]
Hutter

[11] Patent Number: 5,452,833
[45] Date of Patent: Sep. 26, 1995

[54] MAGNETIC-TAPE APPARATUS COMPRISING A PRESSURE-ROLLER DEVICE

[75] Inventor: Heinrich Hutter, Tulln, Austria

[73] Assignee: U.S. Philips Corporation, New York, N.Y.

[21] Appl. No.: 240,950

[22] Filed: May 10, 1994

Related U.S. Application Data

[63] Continuation of Ser. No. 21,922, Feb. 24, 1993, abandoned.

[30] Foreign Application Priority Data

Jun. 26, 1992 [AT] Austria ................................ 1307/92

[51] Int. Cl.⁶ .................... B65H 20/02; F16C 23/08
[52] U.S. Cl. ........................ 226/194; 226/181; 384/206
[58] Field of Search ................................ 226/181, 186, 226/187, 190, 194; 384/418, 206, 211, 212; 242/354, 535, 564.4; 68/126

[56] References Cited

U.S. PATENT DOCUMENTS

| | | | |
|---|---|---|---|
| 1,767,371 | 6/1930 | Kelso | 384/206 |
| 3,315,859 | 4/1969 | Owen, Jr. et al. | 226/21 |
| 3,662,937 | 5/1972 | Borman | 226/194 X |
| 3,949,919 | 4/1976 | Takei | 226/194 |
| 3,989,320 | 11/1976 | McCloskey | 384/206 |
| 4,403,720 | 9/1983 | Grant | 226/194 X |
| 4,591,275 | 5/1986 | Schneider et al. | 384/206 |
| 4,770,550 | 9/1988 | Takahashi | 226/194 X |

FOREIGN PATENT DOCUMENTS

| | | |
|---|---|---|
| 2933965 | 3/1980 | Germany. |
| 4064950 | 2/1992 | Japan. |

*Primary Examiner*—John Q. Nguyen
*Attorney, Agent, or Firm*—Brian J. Wieghaus

[57] ABSTRACT

A magnetic-tape apparatus (1) having a capstan (33) and a pressure-roller device (47) which includes a pressure roller (29) which can be pressed against the capstan (33) and which is rotatably supported on a pressure-roller spindle (50) by a bearing member (51). An outer bearing surface (56) of the bearing member (51) is formed by an outer toric surface having a given meridian radius and an inner bearing surface (55) associated with the pressure roller (29), which inner bearing surface cooperates with the outer bearing surface (56) of the bearing member (51), is formed by an inner toric surface having a given meridian radius, and the outer toric surface (55) associated with the pressure roller (29).

19 Claims, 2 Drawing Sheets

MAGNETIC-TAPE APPARATUS COMPRISING A PRESSURE-ROLLER DEVICE

This is a continuation of application Ser. No. 08/021,922, filed on Feb. 24, 1993 now abandoned.

BACKGROUND OF THE INVENTION

The invention relates to a magnetic-tape apparatus comprising a rotatably drivable capstan for driving the magnetic tape and comprising a pressure-roller device which comprises a pressure roller to be pressed against the capstan, a movable pressure-roller support, a pressure-roller spindle carried by the pressure-roller support, and a substantially rotationally symmetrical bearing member arranged on the pressure-roller spindle for rotatably supporting the pressure-roller spindle, an inner bearing surface being associated with the pressure roller and the bearing member having an outer bearing surface adapted to cooperate with the inner bearing surface, and the inner bearing surface associated with the pressure roller and the outer bearing surface of the bearing member each having a curved shape allowing the pressure roller to perform a pivotal movement to adapt the axial direction of the pressure roller to the axial direction of the capstan.

Such an apparatus of the type defined in the opening paragraph is known from, for example, DE-GM 1,793,121. In this known apparatus the inner bearing surface associated with the pressure roller and the outer bearing surface of the bearing member both have a substantially spherical shape. The inner bearing surface associated with the pressure roller is formed by a first bearing-surface part provided on an annular portion of the pressure roller and by a second bearing-surface part provided on a dome-shaped insert, a pressure spring acting upon the insert to press the insert against the bearing member mounted on the pressure-roller spindle, i.e. against the outer bearing surface of this bearing member. This results in a comparatively intricate construction comprising several parts and the spring load urging the insert against the bearing part has the disadvantage that between the insert and the bearing member a comparatively high static friction is produced which must be overcome when the pressure roller performs a pivotal movement to adapt the axial direction of the pressure roller to the axial direction of the capstan, so that not a continuous but only an abrupt pivotal movement can be realised, which is not beneficial for an undisturbed tape drive. Moreover, the pivotal movement of the pressure roller in the known apparatus is performed about a pivotal centre which is situated exactly in the centre of the spherical bearing surfaces, i.e. coincides with the axis of the pressure roller. This results in a comparatively large distance between the pivotal centre and the contact surface of the capstan against which the pressure roller is urged, which is rather likely to give rise to a non-uniform and asymmetrical force and pressure distribution between the capstan and the pressure roller applied to it in the axial direction of this roller, as a result of which the part of the magnetic tape between the capstan and the pressure roller is loaded in the axial direction of this roller and consequently the magnetic tape is urged out of its tape path necessary for a correct operation, which may lead to tape damage and tape-transport problems and is therefore undesirable.

SUMMARY OF THE INVENTION

It is an object of the invention to avoid the above problems and to provide in an apparatus of the type defined in the opening paragraph a simple and cheap bearing arrangement for the pressure roller and to provide a construction which guarantees a continuous pivotal movement of the pressure roller and does not give rise to an asymmetrical force distribution between the capstan and the pressure roller.

To this end, the invention is characterised in that the inner bearing surface associated with the pressure roller is formed by an inner toric surface having a given meridian radius and the outer bearing surface of the bearing member is formed by an outer toric surface having a given meridian radius, and the outer toric surface of the bearing member engages with clearance in the inner toric surface associated with the pressure roller. This enables the construction of a pressure-roller bearing arrangement allowing a pivotal movement to be very simple, which is advantageous for a high reliability and a cheap production. Moreover, it is thus achieved that substantially no static friction occurs between the inner bearing surface associated with the pressure roller and the outer bearing surface of the bearing member, which ensures a continuous non-abrupt pivotal movement of the pressure roller in order to adapt the axial direction of the pressure roller to the axial direction of the capstan. Thus, it is also achieved that the pivotal centre about which the pressure roller is pivoted is in fact formed by the contact zone between the two toric bearing surfaces, which zone is situated adjacent the capstan, comparatively close to the contact surface of the capstan, as a result of which substantially no asymmetries occur in the force distribution between the capstan and the pressure roller and the magnetic tape is not subjected to any undesirable load, thus always assuring a correct tape transport.

For example, the pressure-roller spindle and the bearing member mounted on it may form a single part and the pressure roller may comprise two parts, the pressure roller being mounted on the bearing member in that first of all one part of the pressure roller is mounted, after which the second part of the pressure roller is fitted and connected to the first part of the pressure roller. However, it is found to be very advantageous if the bearing member is rotatably mounted on the pressure-roller spindle and surrounds the pressure-roller spindle with an inner hollow-cylindrical circumferential surface, and the bearing member further comprises substantially radial slots which in the circumferential direction alternately terminate in its outer circumferential surface comprising the outer toric surface and in its inner circumferential surface surrounding the pressure-roller spindle, of which each time two circumferentially adjacent slots overlap one another in the radial direction. This is particularly advantageous for a simple construction of the pressure roller and for a simple mounting of the pressure on the bearing member because such a bearing member is elastically compressible in the circumferential direction and can thus be introduced axially into the inner bore of a one-piece pressure roller to snap into the pressure roller at the location of the inner toric surface.

It is found to be particularly advantageous if the outer toric surface of the bearing member and the inner toric surface of the pressure roller have the same meridian radius. This is advantageous in order to achieve a very reliable and stable adaptation of the axial direction of the pressure roller to the axial direction of the capstan upon any deviation of the pressure roller from its parallel position relative to the capstan which may occur in practice.

BRIEF DESCRIPTION OF THE DRAWINGS

An embodiment of the invention will now be described in more detail, by way of non-limitative example, with reference to the drawings.

DESCRIPTION OF THE PREFERRED EMBODIMENTS

Figure 1:
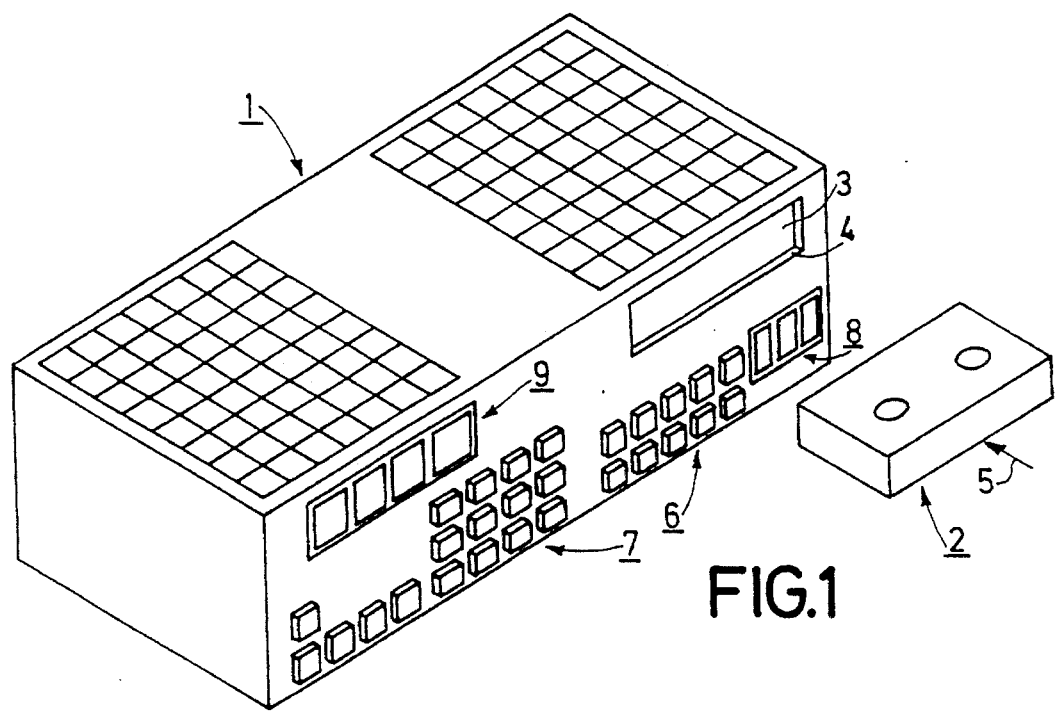
FIG. 1 is a reduced-scale diagrammatic oblique view of a recording and reproducing apparatus for television signals and audio signals, which apparatus is constructed to receive a cassette accommodating a magnetisable record carrier in the form of a tape which extends between two juxtaposed reel hubs and on/from which television signals can recorded or reproduced in inclined tracks by means of rotatable magnetic heads.

FIG. 1 shows a recording and reproducing apparatus 1 constructed for recording and reproducing television signals and audio signals on a magnetisable record carrier in the form of a tape, hereinafter briefly referred to as a magnetic tape. Such an apparatus 1 is usually also referred to as a magnetic-tape apparatus. The magnetic tape is accommodated in a cassette 2 which is shown diagrammatically in FIG. 1 and which comprises two juxtaposed reel hubs between which the magnetic tape extends along a path defined by means of tape guides of the cassette. The cassette 2 can be inserted by hand into the apparatus 1 in a direction indicated by an arrow 5 through an opening 4 which can be closed by means of a cover 3 which can be moved inward. When the cassette 2 is loaded into the apparatus 1 it is inserted into a movable cassette holder which upon complete insertion of; the cassette into the apparatus lowers the cassette perpendicularly to the cassette main walls into an operating position, shown diagrammatically in FIG. 2, inside the apparatus. For starting the modes of the apparatus, such as "record", "normal forward play", "still reproduction", "normal reverse play", "fast forward", "fast reverse" and the like, the apparatus 1 comprises a first set 6 of controls. For programming the apparatus and for entering further data, for example to set a daytime clock, the apparatus 1 comprises a second set 7 of controls. Moreover, the apparatus 1 comprises two display devices 8 and 9, whose displays each comprise for example seven segments and which serve for example for indicating the count of a tape-length measurement counter and for displaying the daytime.

As already stated, a cassette 2 inserted into the apparatus 1 is lowered into an operating position in the apparatus. As is shown diagrammatically in FIG. 2 the cassette 2 accommodates two juxtaposed rotatably drivable reel hubs 10 and 11 between which the magnetic tape 12 extends inside the cassette 2 along a path represented partly as a dash-dot line 13 and on which the magnetic tape can be wound in accordance with its instantaneous direction of transport and in opposite winding directions, as is indicated by means of the arrows 14 and 15. When a cassette 2 is lowered into its operating position in the apparatus 1 two reel spindles 16 and 17 enter into driving engagement with the reel hubs 10 and 11 in the cassette 2, which spindles are rotatably supported in a deck plate 18 of the apparatus 1. The reel spindles 16 and 17 can rotatably drive the two reel hubs 10 and 11 which coaxially engage with these spindles. Obviously, the reel spindles 16 and 17 may be of another construction than shown and may, for example, each comprise a centred positioning mandrel for positioning a reel hub and, eccentric thereto, a driving mandrel for driving a reel hub. To drive the two reel spindles 16 and 17 in the opposite directions of rotation 14 and 15 there has been provided a drive arrangement 19, which is shown only diagrammatically in FIG. 2 and which comprises a drive wheel 20, which can be motor driven and which is stationarily arranged in the apparatus 1, and a drive wheel 21, which can be driven by the first-mentioned wheel and which is supported to be movable parallel to the deck plate 18, which drive wheel 21 can be brought selectively into driving engagement with the circumference of one of two reel-spindle wheels 22 and 23 which are coaxial with and rotationally locked to the reel spindles 16 and 17 and which are disposed at the same axial level.

Figure 2:
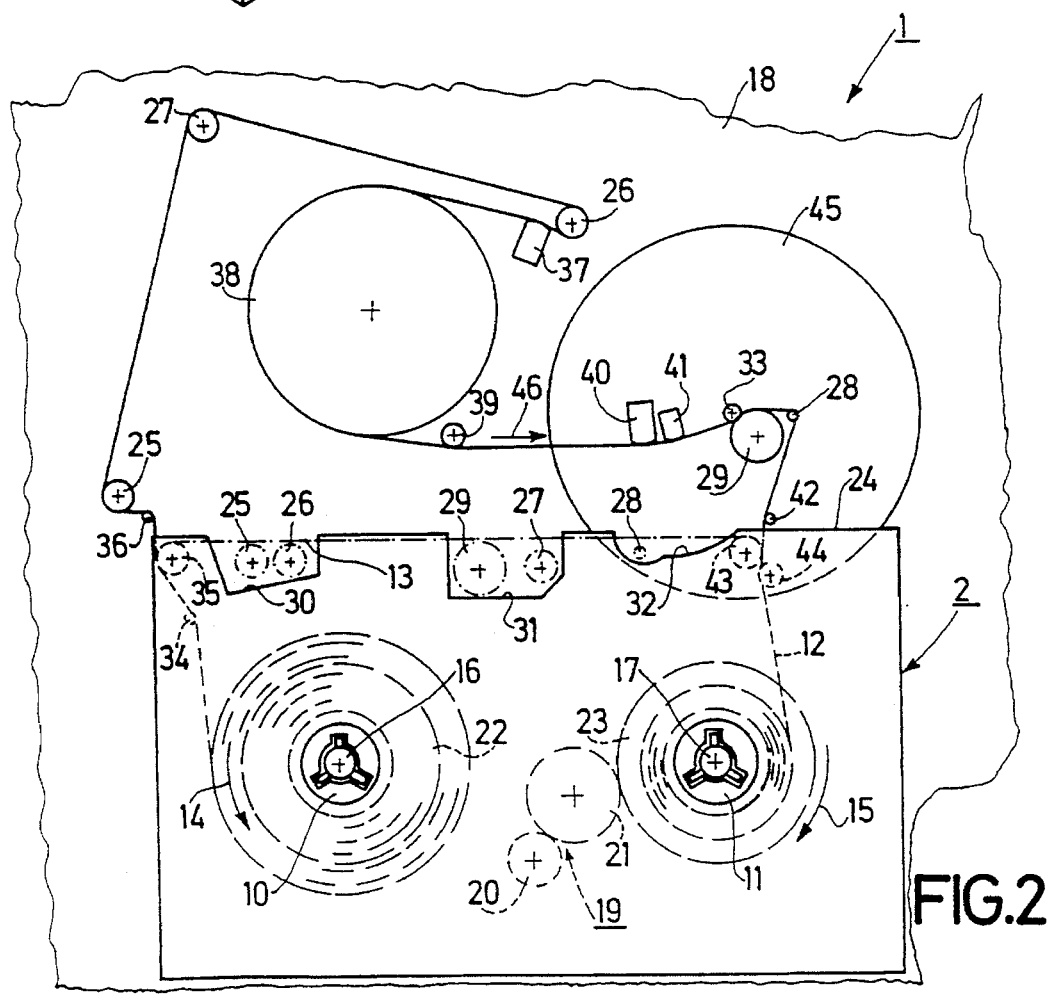
FIG. 2 shows diagrammatically a pan of the apparatus of FIG. 1 to an enlarged scale in comparison with FIG. 1, a cassette being loaded into the apparatus and the record carrier being withdrawn from the cassette and wrapped around guiding and scanning elements of the apparatus.

When the cassette 2 is lowered into its operating position in the apparatus 1 a cassette shutter, not shown and arranged at its front 24, is opened to expose a cassette opening in the front 24, through which opening the magnetic tape 12 accommodated in the cassette 2 can be extracted, and four tape guides 25, 26, 27, 28 and a pressure roller 29, which are each in a rest position shown in dash-dot lines in FIG. 2, engage three openings 30, 31 and 32 in the cassette 2, engaging behind the magnetic tape 12 at the location indicated by the dash-dot line 13. After the cassette 2 has been lowered into its operating position in the apparatus 1 the tape guides 25, 26, 27 and 28 can move into their operating positions shown in solid lines in FIG. 2, the pressure roller 29 being also movable into an intermediate position, not shown in FIG. 2, in the direct proximity of a capstan 33. The magnetic tape 12 is then withdrawn from the cassette 2 through the cassette opening in the front 24 of this cassette. From said intermediate position the pressure roller 29 can be moved into its operating position shown in solid lines in FIG. 2, in which position it presses the magnetic tape 12 against the capstan 33. Since the devices for opening the cassette shutter, actuating the tape guides and the pressure roller, and pressing the pressure roller against the capstan are not relevant to the invention they are now shown for the sake of simplicity. Such devices are known from existing apparatuses of this type. It is to be noted merely that the pressure roller 29 forms part of a pressure-roller device described in detail hereinafter with reference to FIG. 3.

After the tape guides 25, 26, 27, 28 and the pressure roller 29 have been moved to their operating positions the path of the magnetic tape 12 will be as indicated by a solid line. The magnetic tape then extends from the reel hub 10 to the reel hub 11 via two tape guides 34 and 35 provided in the cassette 2, a tape-tension sensor pin 36, which forms pan of a tape-tension control unit, not shown, the movable tape guides 25, 27 and 26, a stationary magnetic head 37 for erasing all the signals recorded on the magnetic tape 12, a drum-shaped scanning unit 38 comprising rotary magnetic heads for recording and reproducing television signals in/from contiguous video tracks which are inclined relative to the longitudinal direction of the magnetic tape, a stationary tape guide 39, a stationary magnetic head 40 for erasing audio signals recorded in an audio track extending in the longitudinal direction of the magnetic tape 12, a further stationary magnetic head 41 for recording and reproducing audio signals in the audio track and for recording and reproducing synchronisation signals in/from a synchronisation track extending in the longitudinal direction of the magnetic tape and parallel to the audio track, the capstan 33, against which the magnetic tape 12 is pressed by the pressure roller 29, the movable tape guide 28, a stationary tape guide 42, and two further tape guides 43 and 44 provided in the cassette 2.

The capstan 33, which is connected to the flywheel 45 in the customary manner, can be driven selectively in one of the two directions of rotation with a constant speed. When the pressure roller 29 is pressed against the capstan 33 this enables the magnetic tape 12 to be driven selectively in one of two opposite transport directions with a constant speed of transport. When the capstan 33, as viewed in FIG. 2, is driven anti-clockwise with a given speed the magnetic tape 12 is driven in the direction indicated by the arrow 46, which corresponds to the so-called "normal forward operation" for the recording of signals in the "record" mode as well as for the reproduction of signals in the "normal forward play" mode, in which the reel-spindle wheel 23, which is rotationally locked to the reel spindle 17, is driven by the drive wheel 21 of the drive arrangement 19 to wind the magnetic tape 12 onto the reel hub 11 in the direction indicated by the arrow 15. When the capstan 33 is driven with the same given speed in the clockwise direction viewed in FIG. 2 the magnetic tape 12 is driven in a direction opposite to that indicated by the arrow 46, which corresponds to the so called "normal reverse operation", also referred to as "reverse operation", in which in the "normal reverse play" mode recorded television signals are reproduced so as to obtain reverse motion scenes and in which the reel-spindle wheel 22, which is rotationally locked to the reel spindle 16, is driven by the drive wheel 21 of the drive arrangement 19 to wind the magnetic tape 12 onto the reel hub 10 in the direction indicated by the arrow 14.

As already stated, the apparatus can also be set to the "fast forward" and "fast reverse" modes in which the magnetic tape 12 is wound between the reel hubs 10 and 11 with a higher speed of transport. In the present apparatus the magnetic tape 12 is returned into the cassette 2 before such a winding operation by resetting the movable tape guides 25, 26, 27, 28 and the pressure roller 29 from their operating positions into rest positions shown in dash-dot lines in FIG. 2 and by simultaneously driving the reel spindle 16 in the direction indicated by the arrow 14 by means of the drive wheel 21 of the drive arrangement 19, after which the magnetic tape 12 again extends along the path indicated by the dash-dot line 13. When the magnetic tape 12 is wound in the "fast forward" and the "fast reverse" mode the magnetic tape 12 is driven exclusively by driving one of the two reel hubs 10 and 11, in which two modes the two reel spindles 16 and 17 can again be driven by the drive arrangement 19 whose drive wheel 21 is brought into circumferential driving engagement with the reel-spindle wheel 23 in the "fast forward" mode and with the reel-spindle wheel 22 in the "fast reverse" mode.

As mentioned, the pressure roller 29 does not cooperate with the magnetic tape 12 during fast winding. However, in for example the "normal forward" and "normal reverse" modes the magnetic tape 12 is pressed against the capstan 33 by means of the pressure roller 29. For a correct transport of the magnetic tape 12 it is then of great importance that the circumference of the pressure roller 29 is exactly positioned against the capstan 33,, the magnetic tape 12 being interposed between the pressure roller 29 and the capstan 33 at the location of a part of the pressure roller 29. Herein, an exact positioning of the pressure roller 29 against the capstan 33 is to be understood to mean that the axis of the pressure roller 29 extends exactly parallel to the axis of the capstan 33. In order to guarantee this the pressure roller 29 is supported so as to be pivotable, as will be described in detail with reference to FIG. 3.

Figure 3:
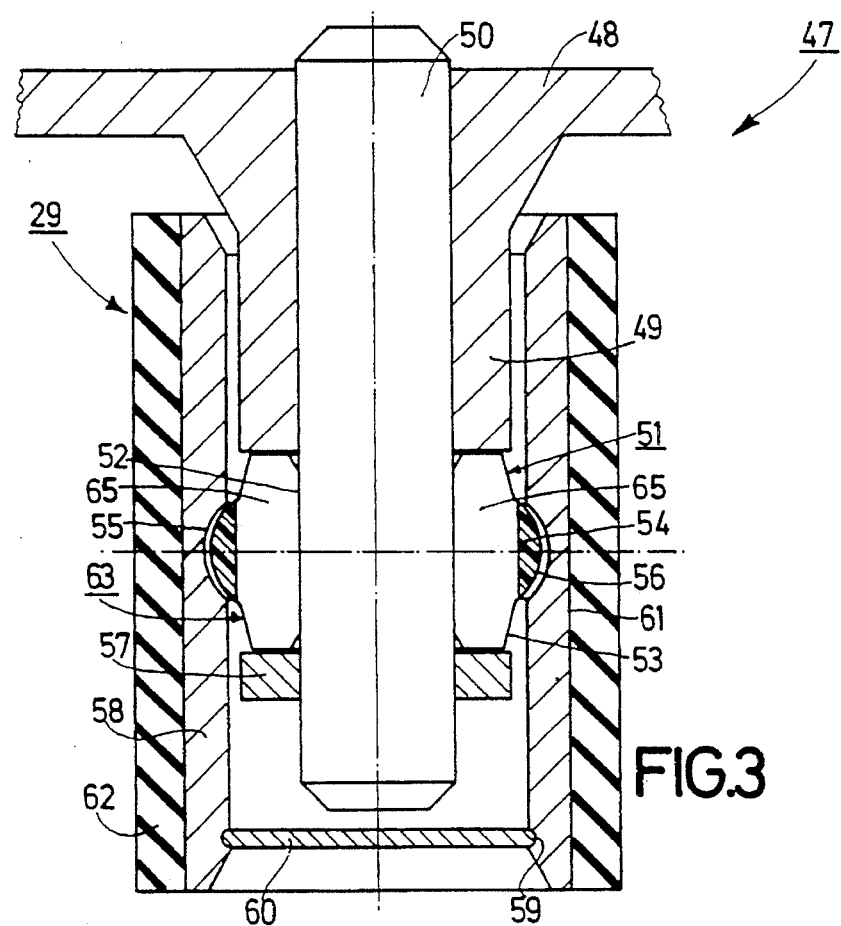
FIG. 3 shows a pressure-roller device of the apparatus in FIGS. 1 and 2 to a scale larger than full scale in a cross-sectional view of the pressure roller of this pressure-roller device, which pressure roller is mounted so as to be rotatable about and pivotable relative to a pressure-roller spindle by means of a bearing member.

A pressure-roller device 47 of the apparatus 1 is shown in FIG. 3, the pressure roller 29 forming pan of this device. The pressure-roller device 47 comprises a lever-type pressure-roller support 48 which, in a manner not shown, is movable relative to a deck plate 18, not shown in FIG. 3, and which is integrally connected to a bearing sleeve 49. A steel pressure-roller spindle 50 is pressed into the bearing sleeve 49. At the location of the pan of the pressure-roller spindle 50 which projects from the bearing sleeve 49 the pressure-roller spindle 50 carries a substantially rotationally symmetrical plastics bearing member 51 for rotatably supporting the pressure roller 29, the bearing member 51 surrounding the pressure-roller spindle 50 with an inner circumferential surface 52. The bearing member 51, whose construction is apparent from FIG. 4, comprises substantially cylindrical inner part 53, from whose outer circumferential surface a toric pan 54 projects, and has an outer bearing surface 56 adapted to cooperate with an inner bearing surface 55 associated with the pressure roller 29. The outer bearing surface 56 of the bearing member 51 and the inner bearing surface 55 associated with the pressure roller 29 each have a curved shape allowing the pressure roller 29 to perform a pivotal movement to adapt the axial direction of the pressure roller 29 to the axial direction of the capstan 33.

With respect to the pressure-roller device 47 it is to be noted that its bearing member 51 is axially retained by means of a retaining ring 57 pressed onto the pressure-roller spindle 50. The pressure roller 29 of the pressure-roller device 47 comprises a sleeve 58 made of a metal, for example steel or aluminum, in whose inner side the inner bearing surface 55 has been formed. A sealing disc 60 is fitted into a groove 59 formed in the end portion of the sleeve 58 which is remote from the pressure-roller support 48. The outer circumferential surface 61 of the sleeve 58 is provided with a sheath 62 of rubber or an elastomeric material, adapted to cooperate with the capstan 33.

Figure 4:
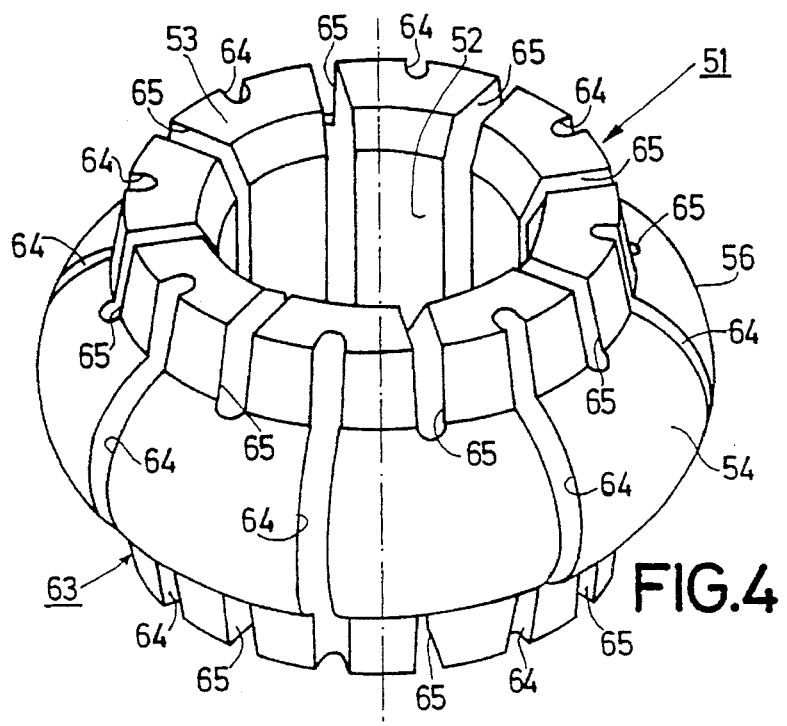
FIG. 4 shows the bearing member of the pressure-roller device in FIG. 3 in an oblique view to an enlarged scale in comparison with FIG. 3.

As is apparent from FIGS. 3 and 4, the outer bearing surface 56 of the bearing member 51 is advantageously formed by an outer toric surface of the toric part 54, which toric surface has a given meridian radius, and the inner bearing surface 55 associated with the pressure roller 29 is formed by an inner toric surface having a given meridian radius. Suitably, the outer toric surface 56 and the inner toric surface 55 have the same meridian radius. It is then essential that the outer toric surface 56 of the bearing member 51 and the inner toric surface 55 associated with the pressure roller 29 interengage with clearance. The bearing member 51 further comprises substantially radial slots 64 and 65 which in the circumferential direction alternately terminate in its outer circumferential surface 63 comprising the outer toric surface 56 and in its inner circumferential surface 52 surrounding the pressure-roller spindle 50, of which each time two circumferentially adjacent slots overlap one another in the radial direction.

For a pressure-roller device 47 actually realised by the Applicant the nominal meridian radius of the inner toric surface 55 on the pressure roller 29 and of the outer toric surface 56 on the bearing member 51 was selected to be 3.0 mm, the nominal diameter of the bearing member 51 at the location of its outer toric surface 56 to be 8.7 mm, and the nominal inner diameter of the pressure roller 29 at the location of its inner toric surface 55 to be 9.0 mm, so that the clearance between the inner toric surface 55 and the outer toric surface 56 had a nominal value of 0.3 mm.

To assemble the pressure-roller device 47 the pressure-roller spindle 50 is first pressed into the pressure-roller support 48. Subsequently, the bearing member 51 is inserted into the pressure roller 29 in the axial direction, the bearing member 51 first being compressed elastically in the circumferential direction and then snapping with its outer toric surface 56 into the pressure roller 29 at the location of the inner toric surface 55. Now the bearing member 51 together with the pressure roller 29 is slid onto the pressure-roller spindle 50, after which the bearing member 51 is no longer circumferentially compressible. Subsequently, the retaining ring 57 is pressed onto pressure-roller spindle 50 to position and retain the bearing member 51 in the axial direction. After this, the sealing disc 60 is fitted into the groove 59 in the pressure roller 29. After this operation the pressure roller 29 is closed in a comparatively satisfactory manner by the bearing sleeve 49 at the location where it faces the pressure-roller support 48 and where it is in principle open and is sealed by means of the sealing disc 60 at the other side, so that all in all the interior space of the pressure roller 20 in which the bearing member 51 is situated is well protected against soiling and other undesirable influences. As is apparent from the above description, this results in a very simple construction and a very simple mounting of the pressure roller.

FIG. 3 shows the pressure-roller device 47 in a situation in which the pressure roller 29 occupies a neutral centre position. In normal operation of the apparatus 1 the pressure roller 29 is pressed against the capstan 33, the outer toric surface 56 of the bearing member 51 being pressed against the inner toric surface 55 of the pressure roller 29 in a substantially linear contact zone at the location radially opposite the capstan 33. This contact zone forms the pivotal centre about which the pressure roller 29 can be pivoted owing to the clearance between the outer toric surface 56 of the bearing member 51 and the inner toric surface 55 of the pressure roller 29 in order to adapt the axial direction of the pressure roller 29 to the axial direction of the capstan 33. As said pivotal centre is situated comparatively close to the circumferential surface of the capstan 33 against which the pressure roller 29 is pressed this ensures nearly always a uniform force or pressure distribution between the capstan 33 and the pressure roller 29, so that the magnetic tape 12 is not subjected to any undesirable loads. Moreover, it provides a high positional stability for the pressure roller 29. This high positional stability is enhanced particularly in that the meridian radii of the outer toric surface 56 of the bearing member 51 and the inner toric surface 55 of the pressure roller 29 are equal. However, the two meridian radii may also differ slightly, in which case it is found to be favourable for a high positional stability if on a micrometer scale the inner toric surface 55 of the pressure roller 29 has a meridian radius smaller than that of the outer toric surface 56 of the bearing member 51. In addition, the high positional stability is enhanced by the flexing effects in the rubber sheath 62 of the pressure roller 29 during its cooperation with the capstan 33.

It is to be noted also that during normal operation of the apparatus 1 the inner circumferential surface 52 of the bearing member 51 slides on the pressure-roller spindle 50 and that between the outer toric surface 56 of the bearing member 51 and the inner toric surface 55 of the pressure roller 29 a rolling process takes place during which substantially no static friction and substantially no frictional-force effects occur, which is advantageous for a smooth, uniform and non-abrupt pivotal movement of the pressure roller 29 relative to the bearing member 51 along said linear pivotal zone. Since sliding occurs between the inner circumferential surface 52 and the pressure-roller spindle 50, i.e. in an area having a small radius, the attendant radius-dependent dissipation, which gives rise to wear, is kept very small. Moreover, sliding occurs in a planar contact zone, i.e. in the contact zone between the inner surface 52 and the pressure-roller spindle 50, so that this neither produces any substantial wear, whereas in the linear contact zone between the two toric surfaces 55 and 56, which zone is inherently liable to wear, a rolling process takes place, which neither produces hardly any wear. Thus, a highly wear-proof construction is realised, which is advantageous for a long life of the pressure-roller device 47.

Embodiments which differ from the constructions described above are also possible. For example, the bearing member may be of another construction and may not have mutually overlapping radial slots. Moreover, the bearing member may be integral with the pressure-roller spindle, which may then be wholly made of a plastics. Furthermore, the pressure-roller device may comprise a pressure-roller support of another construction. In addition, the invention may be employed in differently constructed magnetic-tape apparatuses.

I claim:

1. A magnetic-tape apparatus comprising a rotatably drivable capstan for driving a magnetic tape and a pressure-roller device which comprises a pressure roller to be pressed against the capstan, a movable pressure-roller support, a pressure-roller spindle carried by the pressure-roller support, and a substantially rotationally symmetrical bearing member arranged on the pressure-roller spindle for rotatably supporting the pressure-roller, the pressure roller having an inner bearing surface and the bearing member having an outer bearing surface for cooperating with the inner bearing surface, the inner bearing surface of the pressure roller and the outer bearing surface of the bearing member each having a curved shape allowing the pressure roller to pivot thereabout to adapt the axial direction of the pressure roller to the axial direction of the capstan, characterised in that:

the inner bearing surface of the pressure roller is defined by an inner toric surface having a given meridian radius and the outer bearing surface of the bearing member is defined by an outer toric surface having a given meridian radius, and the outer toric surface of the bearing member engages with a clearance fit in the inner toric surface of the pressure roller.

2. An apparatus as claimed in claim 1, characterised in that the bearing member is rotatably mounted on the pressure-roller spindle and has an inner hollow-cylindrical circumferential surface which surrounds the pressure-roller spindle, and the bearing member further comprises substantially radial slots which in the circumferential direction alternately terminate in its outer circumferential surface comprising the outer toric surface and in its inner circumferential surface surrounding the pressure-roller spindle, of which every two circumferentially adjacent slots overlap one another in the radial direction.

3. An apparatus as claimed in claim 2, characterised in that the outer toric surface of the bearing member and the inner toric surface of the pressure roller have substantially the same meridian radius.

4. A magnetic tape apparatus according to claim 3, wherein the spindle, and the inner circumferential surface of the bearing member are sized relative to each other so that the bearing member rotates freely on the spindle, whereby the pivoting of the pressure roller occurs with rolling contact of the inner toric surface of the pressure-roller on the outer toric surface of the bearing member substantially without sliding between the inner and outer toric surfaces, and the rotation of the pressure roller occurs with relative rotation of the inner hollow-cylindrical surface of the bearing member relative to the spindle substantially without sliding contact of the inner toric surface and the outer toric surface.

5. A magnetic tape apparatus according to claim 2, wherein the spindle and the inner circumferential surface of the bearing member are sized relative to each other so that the bearing member rotates freely on the spindle, and the meridian radii are substantially the same whereby the pivoting of the pressure roller occurs with rolling contact of the inner toric surface of the pressure roller on the outer toric surface of the bearing member substantially without sliding between the inner and outer toric surfaces, and the rotation of the pressure roller occurs with relative rotation of the inner hollow-cylindrical surface of the bearing member relative to the spindle substantially without sliding contact of the inner toric surface and the outer toric surface.

6. An apparatus as claimed in claim 1, characterised in that the outer toric surface of the bearing member and the inner toric surface of the pressure roller have substantially the same meridian radius.

7. A magnetic tape apparatus according to claim 1, wherein the spindle, and an inner-hollow-cylindrical circumferential surface of the bearing member which surrounds the spindle are sized relative to each other so that the bearing member rotates freely on the spindle, and the meridian radii are substantially the same whereby the pivoting of the pressure roller occurs with rolling contact of the inner toric surface of the pressure roller on the outer toric surface of the bearing member substantially without sliding between the inner and outer toric surfaces, and the rotation of the pressure roller occurs with rotation of the bearing member relative to the spindle substantially without sliding contact of the inner toric surface and the outer toric surface.

8. A magnetic tape apparatus according to claim 1, wherein the pressure roller has an inner surface defining an axially extending bore within the pressure roller, the inner surface including the inner toric surface and the inner toric surface defining a cavity within the pressure roller, and the bearing member is resiliently radially compressible such that it is insertable into the bore of the pressure roller and such that the outer toric surface of the bearing member resiliently snaps into the cavity defined by the inner toric surface of the pressure roller.

9. A pressure roller device, comprising:
a) a rotatably mounted support bearing having an outer toric surface with a predetermined meridian radius; and
b) a pressure roller rotatably supported on the support bearing, the pressure roller having an inner toric surface having a predetermined meridian radius, the outer toric surface of the support bearing having a clearance fit with the inner toric surface of the pressure roller and the pressure roller being pivotable thereabout relative to the support bearing.

10. A pressure roller device according to claim 9, wherein said support bearing comprises a spindle and a bearing member rotatably mounted on the spindle having the outer toric surface.

11. A pressure roller device according to claim 10, wherein the pressure roller has an inner surface defining an axially extending bore within the pressure roller, the inner surface including the inner toric surface and the inner toric surface defining a cavity within the pressure roller, and the bearing member is resiliently radially compressible such that it is insertable into the bore of the pressure roller and such that the outer toric surface of the bearing member resiliently snaps into the cavity defined by the inner toric surface of the pressure roller.

12. Pressure roller device according to claim 11, wherein the meridian radii are substantially the same whereby the pivoting of the pressure roller occurs with rolling contact of the inner toric surface of the pressure roller on the outer toric surface of the bearing member substantially without sliding between the inner and outer toric surfaces.

13. A pressure roller device according to claim 12, wherein said bearing member is freely rotatably mounted on said spindle whereby rotation of the pressure roller relative to the spindle occurs with rotation of the bearing member relative to the spindle substantially without sliding contact between the inner and outer toric surfaces.

14. A pressure roller device according to claim 9, wherein the meridian radii are substantially the same whereby the pivoting of the pressure roller occurs with rolling contact of the inner toric surface of the pressure roller on the outer toric surface of the support bearing substantially without sliding contact between the inner and outer toric surfaces.

15. A pressure roller device according to claim 9, wherein the pressure roller has an inner surface defining an axially extending bore within the pressure roller, the inner surface including the inner toric surface and the inner toric surface defining a cavity within the pressure roller, and the support bearing is resiliently radially compressible such that it is insertable into the bore of the pressure roller and such that the outer toric surface of the support bearing resiliently snaps into the cavity defined by the inner toric surface of the pressure roller.

16. A magnetic tape apparatus, comprising:
a) a rotatably driveable capstan; and
b) a pressure roller device, the pressure roller device including (i) a rotatably mounted support bearing having an outer toric surface, and (ii) a pressure roller rotatably supported on the support bearing, the pressure roller having an inner toric surface having a clearance fit with the outer toric surface of the support bearing, the capstan and the pressure roller device being engageable with each other for driving a magnetic tape between the pressure roller and the capstan, and the inner and outer toric surfaces having respective meridian radii which are substantially the same whereby the pressure roller is pivotable relative to the support bearing with rolling contact of the inner and outer toric surfaces substantially without sliding contact between the inner and outer toric surfaces.

17. A magnetic tape apparatus according to claim 16, wherein the support bearing comprises a spindle and a bearing member including the outer toric surface, the bearing member being freely rotatably mounted on said spindle, whereby rotation of the pressure roller occurs with rotation of the bearing member relative to the spindle substantially without sliding contact of the inner and outer toric surfaces.

18. A magnetic tape apparatus according to claim 16, wherein the pressure roller has an inner surface defining an axially extending bore within the pressure roller, the inner surface including the inner toric surface and the inner toric surface defining a cavity within the pressure roller, and the support bearing is resiliently radially compressible such that it is insertable into the bore of the pressure roller and such that the outer toric surface of the support bearing resiliently snaps into the cavity defined by the inner toric surface of the pressure roller.

19. A magnetic tape apparatus, comprising:

a) a rotatably driveable capstan; and b) a pressure roller device, the pressure roller device including (i) a support bearing having a longitudinal axis and an outer toric surface, and (ii) a pressure roller rotatably supported on the support bearing, the pressure roller including a hollow cylindrical portion with an inner surface and an outer surface, the inner surface including an inner toric surface having a clearance fit with the outer toric surface of the support bearing, the capstan and the pressure roller device being engageable with each other for driving a magnetic tape between the pressure roller and the capstan, and the pressure roller being pivotable relative to the support bearing about a pivotal center coincident with a linear contact zone between the inner and outer toric surfaces, the pivotal center being laterally spaced from the longitudinal axis of the support bearing and situated between the inner and outer surfaces of the cylindrical portion of the pressure roller.

* * * * *